Jan. 17, 1961  F. J. KAEHNI  2,968,296
IGNITION SYSTEMS FOR MULTI-CYLINDER ENGINES
Filed March 21, 1958  3 Sheets-Sheet 1

INVENTOR.
Frank J. Kaehni
BY *Webb, Mackey & Burden*
HIS ATTORNEYS

Jan. 17, 1961 F. J. KAEHNI 2,968,296
IGNITION SYSTEMS FOR MULTI-CYLINDER ENGINES
Filed March 21, 1958 3 Sheets-Sheet 3

INVENTOR.
Frank J. Kaehni
BY
Webb, Mackey & Burden
HIS ATTORNEYS

United States Patent Office 2,968,296
Patented Jan. 17, 1961

2,968,296

IGNITION SYSTEMS FOR MULTI-CYLINDER ENGINES

Frank J. Kaehni, Cleveland, Ohio, assignor to Economy Engine Company, Youngstown, Ohio, a corporation of Ohio Filed Mar. 21, 1958, Ser. No. 722,946

21 Claims. (Cl. 123—117)

The present invention relates to multi-cylinder engines and more particularly to ignition systems for such engines. It provides a materially improved ignition system, overcoming many of the known objectionable operating characteristics of such engines and substantially reducing the normal service requirements necessitated by the use of the conventional spark timer mechanism.

Many different suggestions have been made heretofore for improving the ignition of a combustible mixture in the cylinders of a multi-cylinder engine. Many such suggestions have related to the problem of supplying a properly timed spark to ignite the mixture so as to cause the engine to deliver maximum power output per unit of fuel supplied to the engine and, at the same time, provide complete combustion and smooth performance. Despite such proposals and the various improvements which have been made from time to time, the conventional ignition system still remains in use, although somewhat more complicated than earlier conventional systems. The conventional system still in use requires timing mechanism, a distributor, automatic mechanism for adjusting the timing mechanism in accordance with operating conditions, and other auxiliary mechanism in addition to a direct current power source and a set of spark plugs connected to receive high potential current from the distributor. Despite the many improvements made heretofore in the timing adjusting mechanism and in the carburetion system, combustion nevertheless is inefficient at both low and high speeds. Additives of various types have been used in fuels in order to improve combustion, but, despite the numerous improvements of the character mentioned above, the combustion process in such engines remains inefficient.

As indicated above, the conventional ignition system utilizes timing equipment and a distributor to create a single timed spark in each cylinder for igniting the charge therein. This timed spark generally occurs during the compression stroke of any specific cylinder or when the piston is approximately at top dead center. The time of occurrence is varied in accordance with road load or speed or both. With weak current in the spark circuit, the intensity of the spark depends principally upon the gas through which the discharge takes place. This, of course, is subject to considerable variation under the ordinary range of operating conditions. In the conventional timed system, the power at each spark plug is fixed for a given engine speed and, inasmuch as the period during which the timer points are closed at high speeds is of extremely short duration, at higher speeds an exceedingly weak spark is provided. Moreover, temperature is a factor and lower charge temperatures as well as cold spark plug electrode temperatures require higher spark plug voltages because of the lesser conductivity of a cold gas as compared with a hotter gas. Another significant variable relates to the fact that sparks are oscillatory in nature and their frequency of oscillation is no stable quantity but depends upon the capacity and inductance present in the circuit. The resistance in the circuit, the reactance of the coil, the capacity of the wiring and like factors also affect the nature of the spark, giving to the conventional system a task of meeting not only the usual designed-for loads but also recurring peak loads which arise under certain combinations of the above variable conditions. The conventional system does not adequately respond thereto.

In my system, the relation of total available output voltage (secondary) to spark plug gap voltage must always be such that enough reserve voltage is available to maintain a spark any time under the maximum pressure that is reached during the combustion cycle; and, in several of the embodiments illustrated, a series or chain of such sparks is created in compact succession to one another. In common, all embodiments which are disclosed herein provide a hot spark which is effective under the worst operating conditions as well as the best.

In accordance with my invention, I provide a transistorized power supply on the primary side of an ignition coil or transformer for electronically improving the power output. Although the familiar arrangement of a source of direct current, a spark plug load, and a coil and spark distributor therebetween are employed in the systems which I provide, the novel circuits and mechanism which I provide for coupling together these components produce a controlled operation with the significant properties of circuit stability, improved power factor, and better electronic control, reducing or eliminating timer adjustment and point replacement problems, all as hereinafter more specifically set forth.

In the accompanying drawings, I have shown, for purposes of illustration only, several embodiments of my invention. In the drawings.

Figure 1:
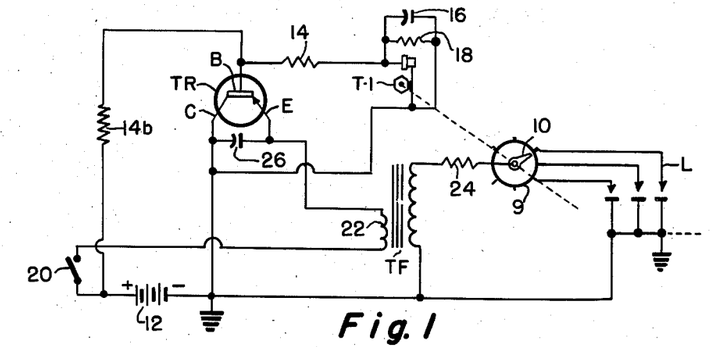
Figure 1 is a schematic showing of a single spark, timed ignition system embodying a transistorized power supply.

In Figure 1, I have illustrated a 12-volt negative grounded ignition system for a multi-cylinder engine which includes a spark distributor 9 having an engine-driven rotor 10, a transistor supply circuit including a junction transistor TR of the p-n-p type, and an output transformer TF coupling the output of the supply circuit to the spark distributor. A spark plug wiring harness forms the load L on the distributor and leads to a set of conventional spark plugs in the engine, which is schematically indicated merely as ground. A battery 12 provides power in the transistor circuit and a timer TI with conventional points is connected to the negative side of the battery 12. A rotor shaft in the distributor forms a drive common to the distributor rotor 10 and the usual rotary cam component in the timer TI, the cam having a predetermined number of lobes corresponding to the number of cylinders in the engine.

The fixed and movable switch-contact points in the timer TI are connected through a base bias resistor 14 to the base electrode B of the transistor TR. A shunt capacitor 16 or a resistor 18, or both, are provided across the points of the timer TI, if desired, for slightly modifying or adjusting the operation, although they are not necessary. Automatic adjustment of the timer points to advance the spark is accomplished by conventional means, not illustrated, which operates in the usual way dependent upon intake manifold vacuum (for which see Figure 3B hereinafter) or engine speed (for which see Figure 5B) or both.

A key controlled ignition switch 20 and the low tension or primary winding 22 of the transformer TF are included in series in the emitter-collector circuit of the transistor TR, the collector electrode C of which is returned directly to ground. With this arrangement, timer point sparking is practically eliminated and the collector heat sink can be grounded for simplicity.

Various makes of transistors are available which are suitable for the present circuits. Minneapolis-Honeywell's P–11, Delco-Remy's types 2N174 and 2N290 and the Motorola and Sylvania power transistors have been used with entirely satisfactory results. With its connections as shown in Fig. 1, the emitter E is the most positive electrode in the transistor. The base B has almost the same potential but it is slightly less than that of the emitter E. The collector electrode C is substantially negative with respect to each of these other two electrodes. The base electrode B is biased with sufficient direct negative current from the resistor 14 to stay slightly negative with respect to the emitter, for instance, $\frac{1}{10}$–$\frac{1}{2}$ volt therebelow.

During operation with the timer points closed and the ignition switch 20 closed, the bias on the base B of the transistor TR is operative to rapidly increase the collector current flow being fed to the transistor from the primary winding 22 in the direction of the arrow on the emitter E, and at or before the collector reaches flow saturation, the winding 22 stores a considerable amount of energy as flux in the core of the transformer TF. Opening of the points in the timer TI interrupts the base current flow from the minus terminal and imposes a positive bias to the base through the resistance 14b causing a break in the current flow from E to C, a rapid collapse of flux in the transformer and a spark at the spark plug.

The oscillations in the secondary circuit produce the spark in the gap of each spark plug and for better transistor performance I insert a high resistance 24 of value from 50 kilohms to approximately 2 megohms in the distributor lead to improve the power factor and also to change the load L to a resistive load of a more desirable character than would prevail without the resistor.

As the flux in transformer TF collapses upon opening of the transistor switch, a counter voltage surge results and, to prevent this peak inverse voltage from going high enough to damage the transistor, I insert a capacitance 26 across the emitter and collector electrodes in the transistor circuit to store a portion of the energy of this collapsing flux and, of course, the capacitance at the right time subsequently reverses the flux in the core. A large value capacitance 26 is necessary to protect the transistor because of the significantly low maximum collector-to-emitter voltage rating thereof. A capacitor of approximately 5 microfarads to 20 microfarads has proved entirely satisfactory.

With the advent of transistors having higher voltage ratings and core materials of higher quality, it is possible to operate with smaller values than those indicated or even without the capacitance 26 in the circuit where two transistors are used as described hereinafter in respect of Figures 3 and 5. In such cases, higher frequencies may be obtained.

Figure 2:
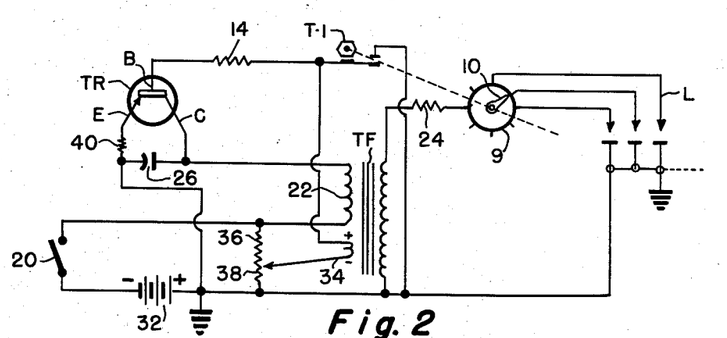
Figure 2 is a schematic showing of a somewhat different system based on another form of single transistor circuit providing a timed series of sparks to each spark plug in firing order of the cylinders.

In Fig. 2, I arrange the single transistor TR as a feedback oscillator in the supply circuit so as to generate a high frequency output which is stepped up by the transformer TF which provides high voltage for ignition purposes. This circuit is applicable to systems in which the positive terminal of the battery 32 is grounded. It may be used for a variety of voltages of from 2 to about 30 volts.

The transformer TF has a closed magnetic core with all windings on one leg. The core has one leg common to the primary winding 22 and to the feedback winding 34 which assures good operation of the transistor oscillator circuit by providing large feedback voltage from the transformer TF. The feedback winding 34 forms one of a pair of parallel-connected branches, the other of which includes and is interrupted by the timer TI and both of which lead to the base electrode B of the transistor through a suitable base bias resistor 14. The primary winding 22 is in circuit with the collector electrode C in the transistor and the emitter electrode E thereof is returned to ground. The voltage divider and bias resistors 14, 36 and 38 provide correct operating conditions for the base B of the transistor.

With the transistor TR connected in the oscillator circuit as shown in Fig. 2, the emitter E is the most positive electrode, being substantially at ground potential. When the points of the timer TI are open, a relatively long potentiometer leg 36 and a relatively short potentiometer leg 38 joined thereto act as a divider to fix the base voltage a slight amount more negative with respect to ground than the emitter, which enables a certain amount of base current to flow. Although a slider appears at the junction between the potentiometer legs for simplified illustration, I have utilized a fixed 300-ohm resistor for the upper leg 36 and a fixed 3-ohm resistor for the lower leg to produce the proper bias. The resistor 14 controls the bias current to the transistor base when the timer contacts are closed. The collector C is substantially negative with respect to both the emitter electrode and the base electrode B.

I have found that a voltage dropping impedance is preferable if not essential, in the input circuit of my system to stabilize the current flow in the transistor TR, which would otherwise vary considerably as the battery voltage fluctuates during operations such as cranking of a vehicle engine by the battery 32. The particular impedance which I provide is inserted in the emitter circuit and consists of a temperature compensated resistance 40 whose characteristic is roughly inverse to that of the transistor, so as to compensate for variations in resistance of the transistor caused by temperature variations.

Closing the timer points TI connects the base current to positive ground stopping the oscillation condition of the transistor circuit. When the timer contacts open, the voltage divider 36, 38 together with resistor 14 supply the correct bias current and voltage to the transistor base causing it to oscillate and produce sparks in the high voltage circuit. The current handled by the timer circuit is only a small fraction of an ampere and causes no sparking at the timer points.

The capacitance 26 connected between the emitter and collector circuits absorbs any high potential surges when the transistor circuit for E and C is open and the magnetic flux in the core collapses. The collapse of the flux causes a high reverse potential in the winding 22 which could damage the transistor.

The transistor oscillator is ineffective as a high frequency generator when the timer points are closed. However, it operates as a highly effective generator at other times and produces sparks at frequencies between 3,000 and 15,000 cycles per second, although somewhat lower frequencies will suffice. The voltage at the spark plugs forming the load L normally is between 5,000 and 30,000 volts for satisfactory operation. The duration of the series of sparks is several degrees of crankshaft rotation and, preferably, for a vehicle engine speed corresponding to 80 m.p.h. road speed, there is one spark cycle for every one or two degrees of crankshaft rotation with the high potential current in the spark plug gap averaging one to ten milliamperes. Thus equipped, an engine performs well at high speeds and at the lower speeds is enabled to perform on up to 20% leaner mixtures owing to the spark cycles which become more and more concentrated per degree of crankshaft rotation at the lower speeds. This so-called continuous spark produces better ignition than the conventional single spark system.

Figure 3:
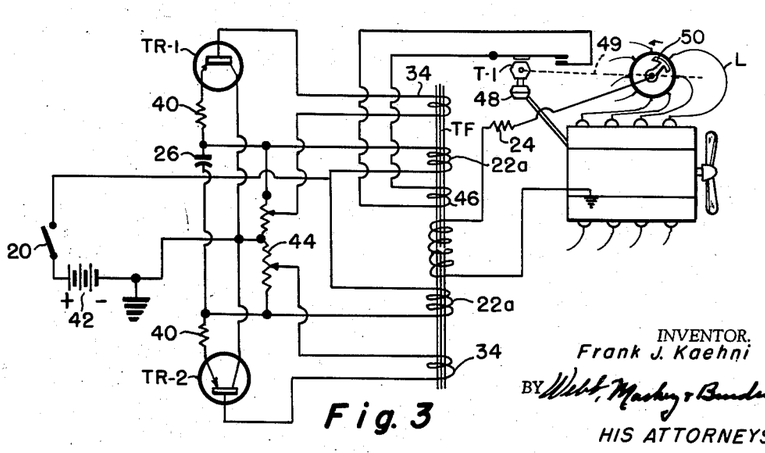
Figure 3 shows a dual transistor circuit for providing a timed series of sparks.

In Fig. 3, an ignition coil transformer TF for coupling the output to load L has a divided transformer primary winding 22a which comprises part of the high frequency generator circuit embodying dual transistors TR1 and TR2 of the type previously described. A negative-grounded battery 42 provides a 12-volt source of power which is connected alternately to two primary windings and to the emitter electrodes of the transistors TR1 and TR2 through appropriate individual stabilizing resistors 40. The collector electrode of each transistor is returned directly to ground. A voltage divider 44 is connected through an individual feedback winding 34 to fix the bias of the base of each transistor.

In the circuits of Figures 1 and 2, the timer points turn the continuous spark on and off by changing the electrical bias current and voltage between the base and emitter terminals of the transistor. In the circuit of Figure 3 (and in that of Figure 4 described hereinafter), the timer points are connected to an additional winding on the ignition transformer and operate to stop or reduce the oscillating condition of the transistors or transistor thus turning off or reducing the ignition energy when the timer points close and short circuit this winding. When the timer points open, the transistor circuit again begins to oscillate and produce the continuous spark. No sparking of timer points occurs in this operation.

Referring again to Figure 3, a single shunt capacitance 26 is connected to the respective stabilizing resistors 40 and is operative within the maximum emitter-to-collector voltage ratings of the two transistors. The transistor TR2 couples the capacitance 26 in shunt between the emitter and collector electrodes of the transistor TR1. The transistor TR1 serves an identical function during corresponding alternate half-cycles. Thus, twice during each cycle the capacitance 26 protects a non-conducting transistor from damage from counter-voltage surges due to its limiting effect on each peak inverse voltage.

The transformer TF has a closed core with all the windings on one leg. The winding 46 is included in a loop circuit controlled by the timer TI in a manner to intermittently short out the coils of that winding and control the amplitude of oscillations of the high frequency transformer TF. The timer TI (Figures 3 and 3B) has a vacuum spark advance mechanism 48 operating from the intake manifold of a spark-ignition engine having eight cylinders as illustrated. A rotor drive shaft 49 driven from the engine operates the cam of the timer TI and a distributor rotor 50 in timed relation, the distributor rotor having a transverse extension so as to present a comparatively wide face (not shown) thereby providing a correspondingly extended time of effectiveness in the distributor in its power conducting relation with the individual contacts fixed at the usual spaced apart intervals therein, the distributor rotor having a transverse extension so as to present a comparatively wide face thereby providing a correspondingly extended time of effectiveness in the distributor in its power conducting relation with the individual contacts fixed at spaced apart intervals therein.

In operation, when the points in the timer TI are open, the high frequency generator circuit operates to supply a series of sparks, although a higher maximum power output is obtainable by using the dual transistors. A high potential secondary current flows through the secondary circuit owing to the small gap the rotor provides and a series of sparks occurs at the appropriate spark plug. When the points in the timer TI close, the winding 46 is shorted out. The output transformer TF supplies drastically reduced power if any to the distributor rotor 10 which therefore is in essentially non-conducting relationship each time while it transfers into registry with the stationary distributor contact associated with the next spark plug to be fired. However, when the shorted coils of winding 46 are open circuited, the oscillations in the transformer resume with an instantaneous build-up to full strength. Thus the timer points T-1 provide an accurately timed series of sparks for each specific cylinder. Timer point sparking and metal transfer are eliminated since there is no spark at the time of break and the oscillations take place after the break. The voltage at the timer points is only a few volts and is alternating in nature, thus preventing the formation of pits and craters such as are formed in the conventional setup.

Figure 4:
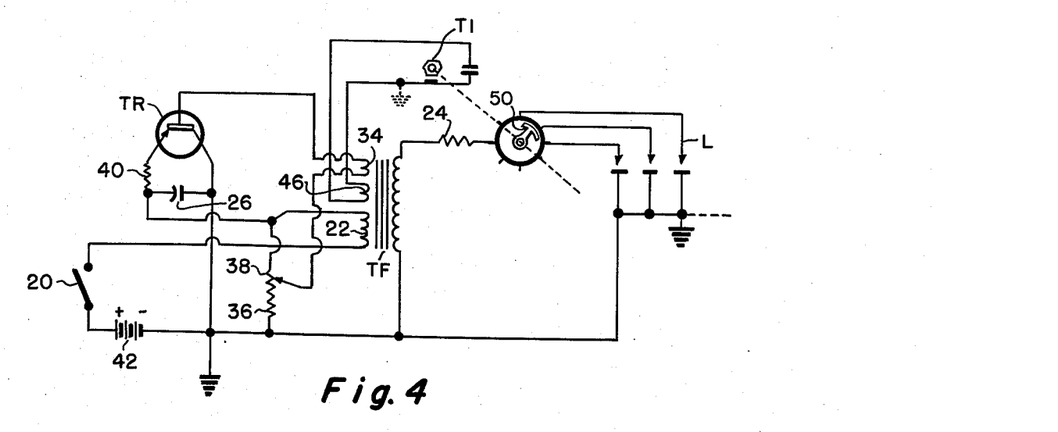
Figure 4 shows a modified single transistor circuit employing a timer to produce a periodic corona condition on each spark plug interrupted by a timed series of sparks.

The embodiment of Fig. 4 corresponds essentially to Fig. 3 except for the use of a single feedback transistor TR which provides the high frequency oscillations. A long potentiometer leg 36 and a short potentiometer leg 38 are series connected as a voltage divider in a manner whereby they are in a ratio of roughly 300 ohms to 3 ohms and whereby the short potentiometer leg 38 biases the base electrode slightly less positive than the positive charge on the emitter electrode and controls the power and output of the transistor oscillator. The collector of the transistor is returned directly to ground at the negative grounded side of a battery 42. The embodiment of Fig. 4 has a closed core the size of which determines the power and frequency of the spark. The same leg of the core in Fig. 4 is common to the transformer primary winding 22, to the feedback winding 34 for the transistor, and to the winding component 46 in the control component loop controlled by the timer TI and grounded at one side. The high voltage secondary winding should be over the other windings on the same core leg to obtain good regulation.

In these latter two embodiments, if the user allows additional space on the primary leg of the transformer core he can with slight modification insert another turn or a few more effective turns in the coil of the winding component 46. This modification enables the looped control circuit to absorb more energy and thus suppress the alternating pulses of flux in the transformer core to a point where the field amplitude is barely perceptible if at all, and thus as long as the breaker points in the timer stay closed, they have an oscillation cut-off function largely eliminating power waste and the battery circuit remains under minor load with negligible power drain. Conversely, the elimination of turns from the winding component 46 so as to limit the number to a few turns or to one or two only, as illustrated in Fig. 4, enables the transistor circuit to oscillate at reduced power while the timer points stay closed, impressing a low-voltage corona condition across each spark plug gap to be fired, beginning as soon as the rotor 10 aligns at the proper position in power conducting relation. Hence, a corona of high frequency is induced in the unfired charge adjacent the spark plug gap before its ignition and continues for the period immediately prior to the instant at which the points open, thus with high-frequency electrical energy thoroughly mixing the combustion charge in that vicinity.

Instantaneously with opening of the timer points so as to open circuit the shorted winding component 46, the voltage at the plug immediately rises to produce a series of high frequency sparks of considerably greater power than the corona. The corona voltage is preferably from 3,000 to 5,000 volts at the plugs and the corona frequency is from 200 to 15,000 cycles per second, depending upon the spark plug gaps and the compression ratio of the engine.

It is readily apparent from the circuit shown in Fig. 1 that the transistor TR forms an effective current amplifier operated by the points of the timer TI, whereby a $\frac{1}{10}$ ampere control current at the timer controls the delivery of up to 10 amperes current in the transformer primary. Compared to the common limitations and disadvantages known with conventional timers, the characteristics of this system mean that burning, pitting, improper sparking, and occasional replacement or readjustment of points are materially reduced or eliminated. These latter problems are likewise absent from the embodiment shown in Fig. 2 in which the points in the timer TI merely operate the control component, and also from Figs. 3 and 4 where the same condition obtains.

Figure 5:
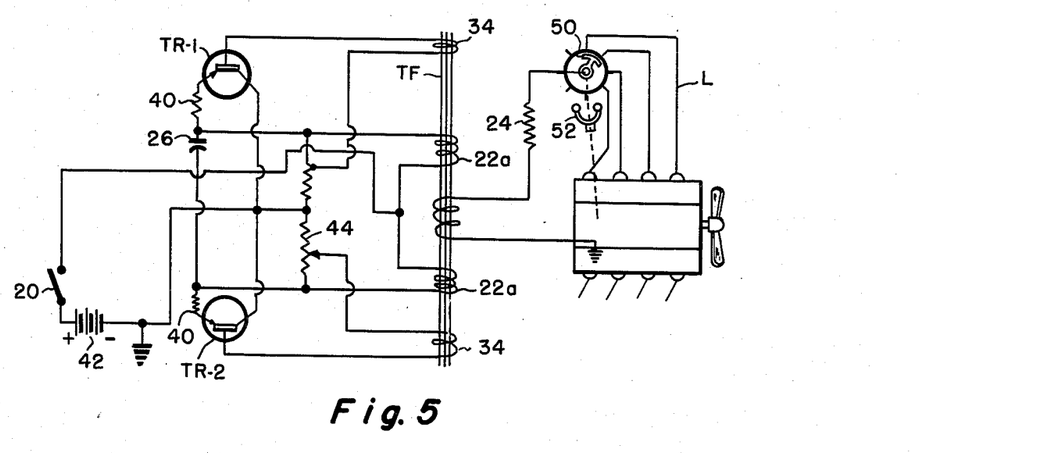
Figure 5 is a schematic showing of a dual transistor circuit in which a sustained train of sparks is furnished to each spark plug of the ignition system and in which the timer points are completely eliminated.

In Fig. 5, the dual transistor oscillator output circuit illustrated is based on the embodiment shown in Fig. 3 except that the timer has been eliminated. Although standard spark plugs may be used with the system of Fig. 5, it is contemplated that the electrodes of the spark plugs will be positioned within an ignition chamber or recess communicating with the main combustion chamber of each cylinder. This recess or ignition chamber provides a precombustion zone which may be physically formed separately from the combustion chamber and then threaded thereinto or it may be formed by shaping the upper portion of the cylinder wall or by the use of a deeply recessed spark plug.

A train of sparks occurs as long as the extended width face rotor 50 is in power transferring relation to an adjacent stationary contact in the distributor and the increase in pressure ahead of the top dead center position during the compression stroke in each cylinder inherently increases the dielectric constant of the gas mixture, making a voltage rise necessary at the plugs in order to keep the spark train sustained. Moreover there is also some change noted in the power factor of the secondary circuit during each pressure cycle due to the high specific inductive capacity of the gas mixture under pressure as compared to normal atmospheric pressure. The foregoing facts, coupled with the further fact that there is a pressure wave lag in the incoming charge to reach the recessed electrodes of the spark plugs, accounts for an inherent delay or inherent timing effect in each cylinder prior to firing the inducted charge. Inasmuch as the voltage at each spark plug varies in accordance with the pressure and temperature conditions in the cylinder, this delay enables the pressure on the unfired charge in each cylinder to increase. Thus, prior to the ultimate firing, the power at each plug generally increases because of the increased voltage and thus a high voltage high power discharge is present to initiate ignition in the engine cylinder. It is appreciated that with or without the spark plug recesses this inherent condition of at least partial timing obtains and therefore many evident advantages of the system are retained in an engine provided with the usual spark plug openings and using conventional commercial plugs therein.

In view of the inherent timing or at least partial timing in the embodiment of Fig. 5, the rotor 50 of the system does not require precise alignment when coordinated with the piston of No. 1 cylinder, and various angular relationships therewith can be set for different engine operating conditions, an example of which is that the rotor face, in terms of cam shaft rotation, comes into initial transverse alignment with the No. 1 cylinder stationary contact at a point corresponding to piston movement to 70° before top-dead-center position and the tail extension thereafter moves alongside and away from that contact at approximately 20° after top-dead-center position of the piston. The rotor shaft is common to the rotor 50 and to a centrifugal-weight operated mechanism 52 which is speed sensitive to automatically change the timing in relation to speed.

Figures 3B, 5B:
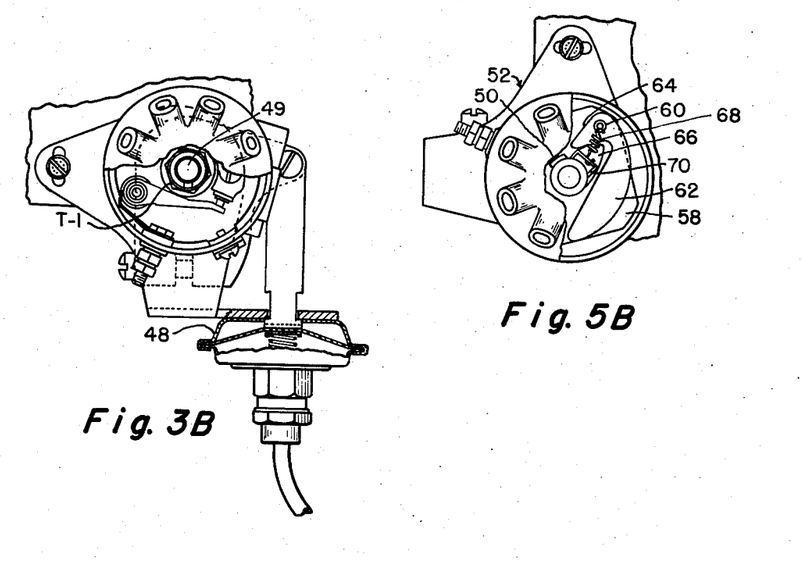
Figure 3B shows the conventional construction of a detail of Figure 3 drawn to larger scale.
Figure 5B shows the conventional construction of a detail of Figure 5 drawn to larger scale.

The centrifugal weight-operated mechanism 52 is shown in greater detail in Figure 5B. It includes a weight base 58 provided with pivot posts 60 about which oscillate flyweights, one of which is shown at 62, during variations of engine speed. The flyweights each provide a camming arm 64 engageable with a cam bar 66 secured in rigid relation with respect to the vertical shaft carrying the distributor rotor 50. A spring 68 hooked between the pivot post 60 and a rigid part 70 of the distributor rotor shaft maintains the cam bar 66 in constant engagement with the camming arm 64. The mechanism to the extent described is well known to those experienced in the art and so is the operation thereof whereby increasing engine speed causes the flyweights 62 to be thrown outwardly, thus camming the cam bar 66 to force the rotor 50 to advance the required few degrees in its direction of rotation.

Following is an example of the dimensions and electrical specifications of the system shown in Fig. 5:

| | |
|---|---|
| Control winding 34 | 12 turns No. 18 copper wire. |
| Stabilizing resistor 40 | 4 in. length of No. 18 Nichrome wire. |
| Divided primary winding 22a | Each portion 31 turns No. 18 wire. |
| Capacitance 26 | 20 microfarads. |
| Secondary of transformer TF | 17,200 turns No. 40 wire. |
| Transformer core material | 0.006 in. grain oriented steel. |
| Winding leg | 3½ in. long. |
| Side leg | 2¼ in. long. |
| Steel cut | ⅞ in. wide. |
| Steel stacked | ⅝ in. high. |
| Spark plug gap | 0.020 in. to 0.040 in. |

Figure 6:
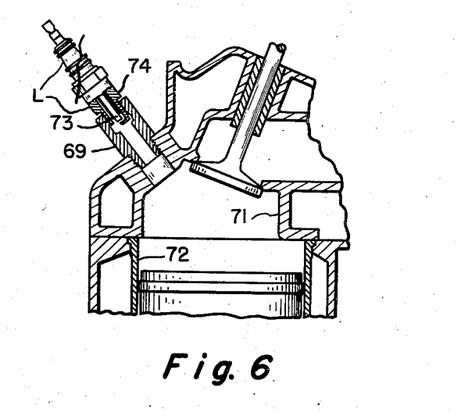
Figure 6 is a fragmentary longitudinal sectional view of engine cylinder fitted with an ignition chamber for the type engine of Figure 5.

In Figure 6, a recess or ignition chamber structure 69 for individually receiving the spark plugs forming the load L is provided for each separate cylinder 72 of the engine so as to define a precombustion zone or chamber communicating at the end with the combustion chamber 71 of that cylinder. The center electrode 73 of the spark plug 74 projects into the other end of the precombustion chamber so as to operatively confront the other projecting electrode of the spark plug.

The foregoing embodiments of the present invention are found to satisfactorily ignite inducted fuel mixtures which are from 5 to 20% leaner than allowed under normal practices with domestic automotive engines, for instance, and thus carburetor settings providing better economy are possible without detectible changes in engine smoothness. High speed operation under high power outputs and also the high-vacuum engine idling conditions are equally satisfactorily performed using my ignition systems.

The transistor oscillator circuits may be arranged as common base, common emitter or common collector types, all of which have been employed successfully. The circuits shown and described above are more effective with present day transistor designs and depend upon whether the battery has either the negative or positive terminal grounded. In the embodiments of Figures 1, 3, 4 and 5 with the negative battery terminal grounded, I have used the grounded or common collector type of circuit; whereas, in Figure 2 with the positive terminal of the battery grounded, a common emitter circuit is used.

While I have shown and described several embodiments of this invention, it will be understood that they are illustrative only and that my invention may be embodied otherwise within the scope of the appended claims.

I claim:

1. In an ignition system for a multi-cylinder engine, a spark distributor for connection to a plural spark plug load and having a controlled rotor frequency dependent on engine rotation, a transistor supply circuit including transistor means with base, emitter and collector electrodes and having a source of direct current and a base bias resistor, and an output transformer coupling the output of said supply circuit to said spark distributor, said transformer including a primary winding coupling said collector and emitter electrodes to said source and operative to supply flux energy to said transformer for delivery of power to the spark distributor, said base bias resistor coupling said base electrode to said emitter electrode and said distributor being included in a load circuit having a resistance common to the plural spark plugs of said load.

2. In an ignition system for a multi-cylinder engine, a spark distributor for connection to a spark plug load and having a controlled rotor frequency dependent on engine rotation, a transistor supply circuit including transistor means with base, emitter and collector electrodes and having a source of direct current and a base bias resistor, an output transformer coupling the output of said supply circuit to said spark distributor and including a primary winding, said primary winding coupling said collector and emitter electrodes to said source so as to supply flux energy to said transformer for delivery of power to the spark distributor, and cut-off means cooperating with at least one transformer circuit comprising a control component moving at said rotor frequency for the initiation and interruption of the flow of normal power in the load in timed relation.

3. In an ignition system for a multi-cylinder engine, a spark distributor forming part of a load circuit, a transistor supply circuit including transistor means with base, emitter, and collector electrodes and having a source of direct current and a base bias resistor, an output transformer coupling the output of said supply circuit to said spark distributor and including a primary winding and a feedback winding thereon, said primary winding coupling said collector and emitter electrodes to said source, said feedback winding coupling said base and emitter electrodes to the output circuit, and oscillation cut-off means cooperating with at least one of the transformer windings.

4. In an ignition system for a multi-cylinder engine, a distributor forming part of a spark plug load circuit, a transistor supply circuit including transistor oscillator means with base, emitter, and collector electrodes and having a source of direct current and a base bias resistor, an output transformer coupling the output of said supply circuit to said distributor and having a feedback winding, said feedback winding coupling said base and emitter electrodes to said base bias resistor, and a resistance of between approximately 50 kilohms and 2 megohms in circuit with said distributor.

5. In an ignition system for a multi-cylinder engine, a distributor forming part of a spark plug load circuit, a transistor supply circuit including transistor oscillator means with base, emitter, and collector electrodes and having a source of direct current, an output transformer coupling the output of said supply circuit to said distributor, a capacitance coupled in circuit between said emitter and collector electrodes, and oscillation cut-off means cooperating with the transformer.

6. In an ignition system for a multi-cylinder engine, a distributor for connection to a spark plug load and having a controlled rotor frequency dependent on engine rotation, a transistor oscillator circuit including junction transistor means with base, emitter and collector electrodes and having a source of direct current and a base bias resistor, an output transformer for supplying the induced output of said supply circuit to said distributor and including a primary winding and a feedback winding thereon, said primary winding coupling said collector and emitter electrodes to said source, said feedback winding coupling said base and emitter electrodes to said base bias resistor, a capacitance coupled in circuit between said emitter and collector electrodes, and oscillation cut-off means cooperating with the transformer windings in said circuit and comprising a control component in inductive relation therewith and having an actuator driven at a speed corresponding to the controlled rotor frequency.

7. In an ignition system for a multi-cylinder engine, a distributor forming part of a spark plug load circuit, a transistor supply circuit including first transistor means with first base, emitter, and collector electrodes and second transistor means with second base, emitter, and collector electrodes, said transistor means having a common source of direct current and having individual first and second base bias resistors respectively, and an output transformer inductively coupling the output of said transistor supply circuit to said distributor and including primary and feedback winding means thereon, said primary winding means providing separate paths coupling said source to said first collector and emitter electrodes and to said second collector and emitter electrodes, said feedback winding means providing for coupling said first base and emitter electrodes to said first base bias resistor, said feedback winding means further providing a similar coupling among said second base and emitter electrodes and said second base bias resistor.

8. In an ignition system for a multi-cylinder engine, a distributor forming part of a spark plug load circuit, a transistor supply circuit including first transistor means with first base, emitter and collector electrodes and second transistor means with second base, emitter, and collector electrodes, said transistor means having a common source of direct current and having individual first and second base bias resistors respectively, an output transformer coupling the output of said supply circuit to said distributor and including primary and feedback winding means thereon, said primary winding means providing separate paths coupling said source to said first collector and emitter electrodes and to said second collector and emitter electrodes, said feedback winding means providing for coupling said first base and emitter electrodes to said first base bias resistor, said feedback winding means further providing a similar coupling among said second base and emitter electrodes and said second base bias resistor, and oscillation cut-off means cooperating with the transformer windings to render the transformer ineffective to deliver normal power and comprising a control component in inductive relationship therewith.

9. In an ignition system for a multi-cylinder engine, the combination comprising a high frequency oscillator circuit including a high frequency, high voltage generator, a spark plug load coupled to said generator through means including a step-up transformer and a spark distributor in circuit therewith having a controlled rotor frequency dependent on engine rotation, said distributor rotor having an extended face in conducting relation with more than one of the individual contacts fixed at spaced apart intervals therein, and a control component controlling the output of said output transformer in timed relation to the frequency of the said distributor rotor so as to intermittently render said generator ineffective to deliver therethrough normal high frequency power to said spark plug load.

10. In an ignition system of a multi-cylinder engine, the combination comprising a high frequency circuit including a high frequency oscillator generator, a spark plug load coupled to said generator through means including an output transformer and a spark distributor in circuit therewith having a controlled rotor frequency dependent on engine rotation, and a control component controlling the output of said generator and output transformer in timed relation to the frequency of said distributor rotor in a manner at initial times to suppress the amplitude of the high frequency oscillations to the magnitude of a corona voltage discharge on a plug to be fired and during the residual time to render the generator effective to deliver normal high frequency power to said plug.

11. In an ignition system of a multi-cylinder engine, the combination comprising a high frequency circuit including a high frequency generator, a plural spark plug load coupled to said generator through means including an output transformer and further including a spark distributor in circuit therewith having a controlled rotor frequency dependent on engine rotation, said distributor rotor having a transverse extension so as to present a comparatively wide face thereby providing a correspondingly extended time of effectiveness in the distributor in its power conducting relation with the individual contacts fixed at spaced apart intervals therein, said rotor selectively completing the flow path for output from said generator and output transformer to said plugs in rotation at the aforesaid controlled frequency thereof and in a manner whereby at initial times to transfer the power flow path to the next plug to be fired enabling firing to be initiated at the right instant and during the residual time to continue delivery of normal high frequency power to said plug once the firing is initiated.

12. The combination according to claim 11 wherein said distributor rotor is capable of limited angular adjustment and is moved in response to a centrifugally created force in a direction to advance the timing of the engine at higher speeds.

13. The combination according to claim 11 and further comprising a control component controlling the output of said output transformer in timed relation to the frequency of said distributor rotor so as to intermittently render said generator ineffective to deliver normal high frequency power therethrough to said spark plug load, said control component being capable of limited angular adjustment and moving in response to a manifold vacuum created force in a manner to advance the timing of the engine under increasing power requirements.

14. Oscillatory electronic apparatus for powering the ignition system of a multi-cylinder vehicle engine comprising, in combination with a high frequency transformer forming the ignition coil of the ignition system, a feedback oscillator coupled to said transformer, said feedback oscillator being provided with feedback means to cause oscillation at a frequency within a normal high range of frequencies under conditions of normal load on said transformer, and added load means inductively coupling said added load between a high frequency winding on the transformer and said feedback means operative to produce a corona voltage under less than the normal power output.

15. For use with the reciprocably movable pistons of a plural cylinder, spark ignition engine having inertia means exterior of the cylinders and connected to the pistons for continuing movement of the pistons, a system for actuating said pistons comprising a spark plug for each cylinder having spaced apart electrodes, a high-frequency oscillator circuit having a source of direct current input and comprising at least one transistor means, a precombustion chamber for each cylinder, each of said precombustion chambers being connected at one end to a different cylinder and each being adapted at the other end to receive one of said spark plugs with the electrodes thereof projecting into such chamber, a distributor, and means including a high-frequency transformer coupling the output of said oscillator circuit through the distributor to said spark plugs, said transformer having a winding with at least two parts, one of which parts providing feedback pulses communicated to and producing oscillations in said transistor means, and another winding in said transformer having a high voltage terminal coupled in power-transmitting relation to said distributor for producing high voltage sparking between the electrodes in each of said precombustion chambers.

16. Oscillatory electronic apparatus for powering the ignition system of a multi-cylinder vehicle engine comprising, in combination with sparking plugs and with a high-frequency transformer connected thereto forming the ignition coil of the ignition system, said sparking plugs being individual to the engine cylinders and presenting electrodes therein adapted to subject the cylinder charge sequentially to a corona voltage for mixing at one stage and to apply normal firing power at another stage, a feedback oscillator coupled to said transformer, said feedback oscillator being provided with feedback means wound on said transformer to cause oscillation at a frequency within a normal high range of frequencies under conditions of normal power load on said transformer, and added load means inductively coupling said added load parasitically between a high-frequency winding on the transformer and said feedback means to alter the control effect of the latter to cause oscillations operative at a frequency in a range at which the lower limit is substantially lower than the range of the normal high frequencies, and operative to produce a corona voltage under less than the normal power output.

17. In combination, a high-frequency circuit including a high-frequency generator, a load coupled to said generator through means including a transformer, a looped control component controlling the output of said generator and said transformer to said load and normally ineffective to conduct current around the loop during operation of said generator, and repetitively-operable, normally-open switching means connected between the ends of the loop of said control component whereby when said switching means is operated to close the loop, a circulating current is induced therein to alter the control effect of said component on said generator to produce a suppression effect on the generated oscillations and thus render said generator ineffective to deliver normal high-frequency power to said load.

18. For use with an engine having a source of direct voltage, an ignition coil adapted to be supplied with said direct voltage to produce high potential sparking current, and a timer having a frequency controlled in dependence on the engine rotation to time the initiation of said sparking current; the combination with said source, coil, and timer, of a high-frequency circuit including said source and a high-frequency generator, a spark plug load coupled to said generator through means including said coil, a looped control component controlling the output of said generator and said coil to said spark plug load and normally ineffective at times to circulate current around the loop during operation of said generator, said timer providing normally open switching means connected between the ends of the loop of said control component whereby when said switching means is operated to close the loop, a circulating current is induced therein to alter the control effect of said component on said generator to provide a suppression effect on the generated oscillations and thus render said generator ineffective to deliver normal high-frequency power to said spark plug load.

19. The combination of claim 18 wherein said means coupling the spark plug load to said generator includes a resistance of between approximately 50 kilohms and 2 megohms in value in circuit relation with the output side of said ignition coil.

20. The combination according to claim 18 wherein said ignition coil comprises a high-frequency transformer arranged with a tuned core of closed construction common to the windings of said transformer, and wherein at least the primary winding, a feedback means to the high-frequency generator, and a portion of said looped control component are wound on the same leg of said core.

21. A circuit arrangement for a high-frequency generator comprising: a pair of direct current input terminals, a relaxation oscillator including a transistor having emitter, base, and collector electrodes coupled to said input terminals, said electrodes being connected in a collector-emitter circuit and an emitter-base circuit, a transformer intercoupling said collector-emitter circuit and said emitter-base circuit in feedback relationship, means comprising an output winding on said transformer for developing an oscillatory voltage from said transistor, and an energy-absorbing loop circuit comprising an additional winding on said transformer and a repetitively operated switch connected in series between the ends of the loop, said energy-absorbing circuit suppressing the energy output by absorbing a substantial portion of the energy developed by the oscillations in said transformer whenever said switch is closed.

References Cited in the file of this patent

UNITED STATES PATENTS

| | | |
|---|---|---|
| 1,343,943 | Thompson | June 22, 1920 |
| 1,589,489 | Snook | June 22, 1926 |
| 2,131,020 | Arthur | Sept. 27, 1938 |
| 2,436,905 | Short | Mar. 2, 1948 |
| 2,852,589 | Johnson | Sept. 16, 1958 |
| 2,878,298 | Giacoletto | Mar. 17, 1959 |

FOREIGN PATENTS

| | | |
|---|---|---|
| 1,137,949 | France | Jan. 21, 1957 |

UNITED STATES PATENT OFFICE
CERTIFICATE OF CORRECTION

Patent No. 2,968,296                                   January 17, 1961

Frank J. Kaehni

It is hereby certified that error appears in the above numbered patent requiring correction and that the said Letters Patent should read as corrected below.

In the drawing, Sheet 1, Fig. 1, the lead extending downwardly from the resistor 14b should be connected to the upper of the two leads connected to the switch 20, i.e., to the open side of the switch as shown; column 5, line 28, strike out "continuous".

Signed and sealed this 1st day of September 1964.

(SEAL)
Attest:

ERNEST W. SWIDER
Attesting Officer

EDWARD J. BRENNE
Commissioner of Paten'